(12) United States Patent
Ohashi et al.

(10) Patent No.: US 9,724,937 B2
(45) Date of Patent: Aug. 8, 2017

(54) INKSET FOR INK JET TEXTILE PRINTING AND INK JET TEXTILE PRINTING METHOD

(71) Applicant: Seiko Epson Corporation, Tokyo (JP)

(72) Inventors: Masakazu Ohashi, Shiojiri (JP); Toru Saito, Yamagata-mura (JP); Tomoki Shinoda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 196 days.

(21) Appl. No.: 14/163,472

(22) Filed: Jan. 24, 2014

(65) Prior Publication Data

US 2014/0210900 A1   Jul. 31, 2014

(30) Foreign Application Priority Data

Jan. 31, 2013   (JP) ................. 2013-016567

(51) Int. Cl.
| | |
|---|---|
| *B41J 2/21* | (2006.01) |
| *B41J 11/00* | (2006.01) |
| *C09D 11/40* | (2014.01) |
| *D06P 5/30* | (2006.01) |
| *C09D 11/10* | (2014.01) |
| *C09D 11/322* | (2014.01) |
| *C09D 11/38* | (2014.01) |

(52) U.S. Cl.
CPC ........... *B41J 11/002* (2013.01); *B41J 2/2107* (2013.01); *C09D 11/10* (2013.01); *C09D 11/322* (2013.01); *C09D 11/38* (2013.01); *C09D 11/40* (2013.01); *D06P 5/30* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ............ 347/95–102; 106/31.6, 31.13, 31.27; 523/160, 161
See application file for complete search history.

(56) References Cited

U.S. PATENT DOCUMENTS

| | | | |
|---|---|---|---|
| 5,847,026 A | 12/1998 | Kitahara et al. | |
| 6,890,378 B2 * | 5/2005 | Yatake | C09D 11/40 347/100 |
| 2009/0082503 A1 * | 3/2009 | Yanagi | C09D 11/326 524/301 |
| 2010/0091052 A1 | 4/2010 | Ogawa et al. | |
| 2010/0214352 A1 * | 8/2010 | Tsunoda | C09D 11/30 347/21 |
| 2011/0057981 A1 * | 3/2011 | Aruga | C09D 11/322 347/20 |
| 2012/0188312 A1 * | 7/2012 | Nakagawa | B41J 2/2107 347/86 |

FOREIGN PATENT DOCUMENTS

| | | |
|---|---|---|
| JP | 08-20739 A | 1/1996 |
| JP | 09-143407 A | 6/1997 |
| JP | 2001-081372 A | 3/2001 |
| JP | 2009-030014 A | 2/2009 |
| JP | 2009-149774 A | 7/2009 |
| JP | 2011-174007 A | 9/2011 |

* cited by examiner

*Primary Examiner* — Manish S Shah
(74) *Attorney, Agent, or Firm* — Nutter McClennen & Fish LLP; John J. Penny, Jr.; Alex Nagorniy

(57) ABSTRACT

An inkset for ink jet textile printing includes a first ink having a pigment and a resin; and a second ink having a pigment, a resin, and an emulsifier, in which the emulsifier includes at least one kind selected from an anionic emulsifier represented by the following general formula (1) and a nonionic emulsifier represented by the following general formula (2), whose HLB value is 12 or more, $$R^1\text{—O—}(CH_2\text{—}CH_2\text{—O})_n\text{-A} \qquad (1), \text{ and}$$

$$R^2\text{—O—}(CH_2\text{—}CH_2\text{—O})_m\text{—H} \qquad (2).$$

24 Claims, No Drawings

INKSET FOR INK JET TEXTILE PRINTING AND INK JET TEXTILE PRINTING METHOD

BACKGROUND

1. Technical Field

The present invention relates to an inkset for ink jet textile printing and an ink jet textile printing method using the same.

2. Related Art

In the related art, a textile printing method of recording an image on cloth such as fabrics, knitting, and non-woven fabrics is known. As the textile printing method, a screen textile printing method is widely used, and the use of an ink jet recording method is recently examined in terms of using an ink used for textile printing efficiently or the like. Specifically, in the textile printing method using the ink jet recording method (hereinafter, also referred to as an "ink jet textile printing method"), an image is formed on cloth by discharging an ink in a state of droplets from a nozzle of a head to be attached to the cloth.

The ink used for the ink jet textile printing method is formed of, for example, coloring matters such as a pigment or a dye, dispersants (surfactants), and solvents (water, an organic solvent, and the like). Specifically, JP-A-2011-174007 discloses an ink for ink jet textile printing containing water, a water-soluble solvent, dispersants such as polyoxyethylene alkyl ether, disperse dyes, acetylenediol, and acetylene glycol.

However, when a dye is used as a coloring matter, since properties such as light resistance of an image to be recorded are not likely to be excellent, a pigment is used instead of a dye in some cases. For this reason, an ink for ink jet textile printing which contains a color pigment, a polymer dispersant, resin emulsion which is a binder component, and an aqueous medium is considered to be used.

However, when a pigment is used as a coloring matter, a fixing resin is necessary to be added to an ink in order for the pigment to be fixed on cloth. Particularly, the cloth in which an image is recorded (printed) with the ink jet textile printing method is used for clothes or bedclothes which need to be washed frequently in many cases. Accordingly, it is necessary to increase the amount of a resin in an ink for improving fixation (friction resistance) of an image recorded on cloth.

However, since the ink for ink jet textile printing using a pigment as a coloring matter has a large amount of the resin contained in the ink, aggregates due to a resin are easily generated and likely to be generated particularly near a nozzle of an ink jet recording apparatus or at a portion in which a gas-liquid interface is formed in an ink supply passage.

In addition, since the cloth on which an image is printed by the textile printing has a property of being easily contracted or expanded, a soft resin with a low glass transition temperature is added to an ink in order for the recorded image to follow the cloth in some case. Since such a resin easily forms a film, aggregates due to the resin may be generated more frequently.

SUMMARY

An advantage of some aspects of the invention is to provide an inkset for ink jet textile printing capable of suppressing the generation of aggregates and recording an image with excellent friction resistance and an ink jet textile printing method using the same.

The invention can be implemented as the following aspects or application examples.

Application Example 1

According to this application example, there is provided an inkset for ink jet textile printing including a first ink having a pigment and a resin; and a second ink having a pigment, a resin and an emulsifier, in which the emulsifier includes at least one kind selected from an anionic emulsifier represented by the following general formula (1) and a nonionic emulsifier represented by the following general formula (2), whose HLB value is 12 or more,

$$R^1—O—(CH_2—CH_2—O)_n-A \quad (1)$$

(in the general formula (1), $R^1$ represents a substituted or unsubstituted hydrocarbon group having 18 or more carbon atoms, A represents $—SO_3M$, $—PO_3HM$, or $—CH_2COOM$, M represents alkali metal, ammonium, or alkanolamine, and n represents an integer from 2 to 20), and

$$R^2—O—(CH_2—CH_2—O)_m—H \quad (2)$$

(in the general formula (2), $R^2$ represents a substituted or unsubstituted hydrocarbon group having 1 to 16 carbon atoms and m represents an integer from 2 to 20).

Application Example 2

In the inkset for ink jet textile printing according to Application Example 1, the content of the emulsifier in the first ink is less than 0.03% by mass.

Application Example 3

In the inkset for ink jet textile printing according to Application Example 1 or 2, the content of the emulsifier contained in the second ink is from 0.03% by mass to 0.3% by mass.

Application Example 4

In the inkset for ink jet textile printing according to any one of Application Examples 1 to 3, the first ink is used to form a base layer to which the second ink is attached on the cloth.

Application Example 5

In the inkset for ink jet textile printing according to any one of Application Examples 1 to 4, the pigment contained in the first ink is a white-based pigment, and the pigment contained in the second ink is a pigment other than the white-based pigment.

Application Example 6

In the inkset for ink jet textile printing according to Application Example 5, the white-based pigment is titanium oxide.

Application Example 7

In the inkset for ink jet textile printing according to any one of Application Examples 1 to 6, the coating elongation of the resin contained in the first ink and the coating elongation of the resin contained in the second ink are in the range of 400% to 1200%.

Application Example 8

In the inkset for ink jet textile printing according to any one of Application Examples 1 to 7, both the resin contained in the first ink and the resin contained in the second ink contain at least one kind selected from a urethane-based resin and an acrylic resin.

Application Example 9

According to this application example, there is provided an ink jet textile printing method which uses the inkset for ink jet textile printing according to any one of Application Examples 1 to 8 including forming a first image formed by the first ink by attaching the first ink to the cloth; and forming a second image formed by the second ink by attaching the second ink to the first image.

Application Example 10

In the ink jet textile printing method according to Application Example 9, the forming of the second image is performed when a residual rate of a volatile component is 30% or more in a case in which the weight of the volatile component contained in the first ink used to form the first image is set to 100%.

Application Example 11

In the ink jet textile printing method according to Application Example 9 or 10, a coagulant which reacts with a component contained in the first ink is provided in a range of the cloth on which the first image is formed.

Application Example 12

In the ink jet textile printing method according to any one of Application Examples 9 to 11, the attached amount of the first ink attached to the cloth is 180 mg/inch$^2$ or more in the forming of the first image.

DESCRIPTION OF EXEMPLARY EMBODIMENTS

Hereinafter, the preferred embodiments of the invention will be described. The embodiments described below merely describe an example of the invention. Further, the invention is not limited to the following embodiments and includes various modifications performed within the range without departing from the scope of the invention.

1. Inkset for Ink Jet Textile Printing

An inkset for ink jet textile printing according to an embodiment of the invention includes a first ink having a pigment and a resin; and a second ink having a pigment, a resin, and an emulsifier, in which the emulsifier includes at least one kind selected from an anionic emulsifier represented by the general formula (1) described below and a nonionic emulsifier, represented by the general formula (2) described below, whose HLB value is 12 or more.

Hereinafter, the details for each ink will be described.
1.1. First Ink

The first ink contained in the inkset for ink jet textile printing according to the present embodiment contains a pigment and a resin.

The first ink according to the invention is used to form a base layer to which the second ink is attached. For example, in a case in which the second ink has a hue close to that of cloth or cloth having low brightness (for example, black or dark blue cloth) is used, an image is difficult to be recognized in some cases even when the image formed by the second ink is formed on the cloth. In such cases, the visibility of the image formed by the second ink formed on the base layer can be improved by forming the base layer formed of the first ink on the cloth using the first ink having a different hue from that of the second ink. From the reason described above, it is preferable that the first ink and the second ink have different hues or brightness from each other. For example, when a color ink containing a color pigment (a yellow ink, a magenta ink, a cyan ink, or the like) or a black ink containing a black pigment is used as the second ink, the image formed by the second ink becomes difficult to be recognized when the cloth is of a black color. In this case, for example, the visibility of the image formed by the second ink can be improved by forming the image (base layer) formed of the first ink which contains a white pigment on the cloth.

Alternatively, the base layer may be formed to improve adhesion or coloring property of the image formed by the second ink. At this time, the first ink used to form the base layer may be a so-called clear ink which does not contain a coloring matter or only contains a small amount thereof (0.1% by mass or less based on the ink). In this case, the first ink may not have a different hue or brightness from those of the second ink.

In the invention, the phrase "having a different hue" means that a hue angle h° defined in the CIELAB color space is 30° or more.

Further, the phrase "cloth having low brightness" means cloth having an L value (brightness) of 50 or less, which is defined in the CIELAB color space. In addition, the L value can be measured using a colorimeter equivalent to Gretag Macbeth Spectrolino (trade name, manufactured by X-Rite, Inc.), for example.

Specifically, the hue or brightness of the ink which is different from that of the other ink refers to a hue or brightness in a case in which a pattern (a pattern when the entire area of the recording medium are enclosed by an ink) when an ink is recorded on a white recording medium (photographic "Gloss" paper manufactured by Seiko Epson Corp.) with a duty of 100% is measured using the above-described method. Further, a case in which the color names of the inks are different from each other corresponds to the case in which the hue or brightness of the ink is different from that of the other ink.

Here, the term "CIELAB color space" means an approximate uniform color space which was recommended by the Commission Internationale de l'Eclairage (CIE) in 1976. The CIE refers to the CIELAB color space as CIE1976 (L*a*b*).

Hereinafter, the components contained in the first ink will be described in detail.
1.1.1. Pigment Both an organic pigment and an inorganic pigment can be used as the pigment contained in the first ink. As long as the pigment contained in the first ink is selected to have a different hue from that of the second ink described above, a white-based pigment or a pigment other than the white-based pigment can be used as the pigment contained in the first ink.

Any color of pigment can be used for the first ink, but in the case in which the inkset for ink jet textile printing according to the present embodiment is used for recording on the cloth having low brightness, it is preferable to use a white-based pigment for the first ink. This is because the visibility of the image formed by the second ink, which is formed on the image recorded by the first ink, is improved.

As the white-based pigment, which is not limited to the following, for example, a white inorganic pigment such as titanium oxide, zinc oxide, zinc sulfide, antimony oxide, or zirconium oxide can be exemplified. A white organic pigment such as a white hollow resin particle or a polymer particle can be used instead of the white inorganic pigment.

As the color index (C.I.) of the white-based pigment, which is not limited to the following, for example, C.I. Pigment White 1 (basic lead carbonate), 4 (zinc oxide), (a mixture of zinc sulfide and barium sulfate), 6 (titanium oxide), 6:1 (titanium oxide containing other metal oxides), 7 (zinc sulfide), 18 (calcium carbonate), 19 (clay), 20 (mica titanium), 21 (barium sulfate), 22 (natural barium sulfate), 23 (gloss white), 24 (alumina white), 25 (plaster), 26 (magnesium oxide and silicon oxide), 27 (silica), or 28 (anhydrous calcium silicate) is exemplified. Among these, titanium oxide is preferable because titanium oxide is excellent in coloring property, concealing property, and visibility (brightness) and excellent dispersion particle size can be obtained.

Among the above-described titanium oxides, general rutile type titanium oxide is preferable as the white-based pigment. As the rutile type titanium oxide, self-produced titanium oxide or commercially available titanium oxide may be used. As an industrial production method in the case in which the rutile type titanium oxide (powdery) is self-produced, known methods such as a sulfate method and a chlorine method in the related art can be exemplified. Examples of the commercially available products of the rutile type titanium oxide may include rutile types such as Tipaque (registered trade mark) CR-60-2, CR-67, R-980, R-780, R-850, R-980, R-630, R-670, and PF-736 (all trade names, manufactured by Ishihara Sangyo Kaisha, Ltd.).

50% average particle size of titanium oxide (hereinafter, also referred to as "D50") is preferably in the range of 50 nm to 500 nm and more preferably in the range of 150 nm to 350 nm. When the D50 is within the above-described range, the ink has excellent friction resistance and the visibility of the recorded image may become excellent, so an image with high image quality can be formed.

Here, "the 50% average particle size of titanium oxide" in the present specification means D50 of titanium oxide which exists in an ink, not D50 of titanium oxide before an ink is prepared. In addition, the "50% average particle size" in the present specification means 50% average particle size in terms of sphere determined by a dynamic light scattering method and is a value obtained as follows.

Particles in a dispersion medium is irradiated with light and diffraction scattering light being generated is measured by a detector arranged at the front, lateral, and rear side of the dispersion medium using the obtained measured value. It is assumed that a particle which originally has an undeterminated form is spherical, and a cumulative curve is acquired by setting the entire volume of a particle group converted to a sphere having a volume equivalent to that of the particle to 100%, and the point whose cumulative value becomes 50% during that time is set to "50% average particle size (D50) using a dynamic light scattering method in terms of sphere."

When titanium oxide is used as the white-based pigment, it is preferable that titanium oxide to which a surface treatment is applied using alumina silica be applied in order to suppress a photocatalytic action. The amount of the surface treatment (amount of alumina silica) at the time may be 5% by mass to 20% by mass based on the total mass (100% by mass) of a white pigment to which the surface treatment is applied.

A pigment other than the white-based pigments means a pigment in which the above-described white-based pigments are excluded. As the pigment other than the white-based pigments, which is not limited to the following, for example, an azo-based, phthalocyanine-based, dye-based, condensed polycyclic, nitro-based, or nitroso-based organic pigment (brilliant carmine 6B, lake red C, watching red, disazo yellow, hansa yellow, phthalocyanine blue, phthalocyanine green, alkali blue, aniline black, or the like); metals such as cobalt, iron, chrome, copper, zinc lead, titanium, vanadium, manganese, and nickel; metal oxides; sulfide; carbon blacks such as furnace carbon black, lamp black, acetylene black, and channel black (C.I. Pigment black 7); and an inorganic pigment such as yellow ocher, ultramarine, or navy can be used.

More specifically, examples of the carbon black which can be used as a black-based pigment include MCF88, No. 2300, 2200B, 900, 33, 40, 45, 52, MA7, 8, and 100 (all trade names, manufactured by Mitsubishi Chemical Corporation); Raven 5750, 5250, 5000, 3500, 1255, and 700 (all trade names, manufactured by Columbia Carbon Company); Regal 400R, 330R, 660R, Mogul L, Monarch 700, 800, 880, 900, 1000, 1100, 1300, and 1400 (all trade names, manufactured by Cabot Corporation); Color Black FW1, FW2, FW2V, FW18, FW200, S150, S160, 5170, Printex 35, U, V, 140U, Special Black 6, 5, 4A, and 4 (all trade names, manufactured by Degussa Corp.).

Examples of the yellow-based pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the magenta-based pigment include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, C.I. Pigment Violet 19, 23, 32, 33, 36, 38, 43, and 50.

Examples of the cyan-based pigment include C.I. Pigment Blue 1, 2, 3, 15, 15:1, 15:2, 15:3, 15:34, 15:4, 16, 18, 22, 25, 60, 65, and 66.

Examples of the pigment other than magenta, cyan, and yellow include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, and 63.

The pigments described above may be used alone or in combination of two or more kinds thereof.

The content of the pigment contained in the first ink is preferably in the range of 1% by mass to 30% by mass, more preferably in the range of 5% by mass to 15% by mass, and still more preferably in the range of 5% by mass to 12% by mass based on the total mass of the first ink from the viewpoint of securing excellent coloring properties of the pigments, which are different from one another depending on the kind of pigment being used. Among these, when titanium oxide is used as the pigment contained in the first ink, since titanium oxide is difficult to be precipitated (particularly, on the cloth with low brightness) and has excellent concealing properties and color reproducibility, the content thereof is preferably in the range of 3% by mass to 25% by mass and more preferably in the range of 5% by mass to 20% by mass based on the total mass of the first ink.

The pigment may be a pigment to which a surface treatment is applied or a pigment using a dispersant or the like from the viewpoint of improving dispersibility in the ink.

The pigment to which a surface treatment is applied is a pigment in which a hydrophilic group (a carboxyl group, a sulfonic acid group, or the like) is allowed to be dispersed in an aqueous solvent by being directly or indirectly bound on the surface of the pigment with a physical treatment or a chemical treatment (hereinafter, also referred to as a "self-dispersing type pigment").

In addition, the pigment using a dispersant is a pigment which is allowed to be dispersed by a surfactant or a resin (hereinafter, also referred to as a "polymer-dispersing type pigment"), and it is possible to use a known substance as a surfactant or a resin. Further, among the "polymer-dispersing type pigments", a pigment coated with a resin is also included. The pigment coated with a resin can be obtained using an acid deposition method, a phase inversion emulsification method, and a mini-emulsion polymerization method.

1.1.2. Resin

The first ink contains a resin. Since the adhesion between the first ink and the cloth can be improved by containing a resin, the friction resistance of the image to be formed of the first ink can be improved.

In the inkset for ink jet textile printing according to the present embodiment, it is preferable that the image being recorded (that is, an ink film being formed by the ink) be easily expanded or contracted (easily elongated) because the inkset is frequently used for recording on a recording medium which is easily expanded or contracted, such as cloth. That is, it is possible to prevent the ink film from being damaged or cracked and to secure washing and friction fastness by having an elongation in which the ink film can be expanded or contracted corresponding to the expansion or contraction of the cloth. From this viewpoint, the coating elongation of the resin contained in the first ink is preferably in the range of 400% to 1200%, more preferably in the range of 500% to 1200%, still more preferably in the range of 600% to 1200%, and particularly preferably in the range of 700% to 1200%. When the coating elongation of the resin is within the above-described range and is especially not lower than the lower limit, an image with an excellent following property with respect to the expansion or contraction of the cloth can be formed. Further, when the coating elongation of the resin is within the above-described range and is especially not higher than the upper limit, the viscosity of the ink film can be maintained in an appropriate range and degradation of an anchoring effect on the cloth can be suppressed, and therefore an image with excellent washing and friction fastness (friction resistance) can be formed while the degradation of fixation is suppressed.

Here, the coating elongation of the resin is measured as follows. Firstly, the resin is coated on a polytetrafluoroethylene sheet such that the film thickness after drying becomes 500 μm, dried at normal temperature (20° C.) and at normal pressure (65% RH) for 15 hours, and further dried at 80° C. for 6 hours and at 120° C. for 20 minutes, and then is peeled off from the sheet to form a resin film. Further, the coating elongation of the obtained resin film is measured using a tension tester at a measurement temperature of 20° C. and measurement speed of 200 mm/min. The measurement of the coating elongation is performed by elongating the resin film and measuring the length of the coating film elongated before being damaged, and the ratio thereof is represented as the coating elongation as a percentage. In addition, as the tension tester, for example, a tensilon universal tester RTC-1225A (trade name, Orientec Co., Ltd.) or a tester equivalent to the tensilon universal tester can be used.

Further, in the resin contained in the first ink, a glass transition point (Tg) thereof is preferably 0° C. or less and more preferably −10° C. or less from the viewpoint that it is possible to prevent the ink film from being damaged or cracked and to secure washing and friction fastness. In addition, the lower limit of the glass transition point (Tg) is preferably −80° C. or higher. Further, in the resin contained in the first ink, the minimum film formation temperature (MFT) thereof is preferably 0° C. or less and more preferably −10° C. or lower from the viewpoint that it is possible to prevent the ink film from being damaged or cracked and to secure washing and friction fastness. Furthermore, the lower limit of the minimum film formation temperature is preferably −80° C. or higher.

It is preferable that the resin contained in the first ink be emulsion from the viewpoint that the friction resistance and fixation of the coating, and storage stability of the first ink can be improved. The resin contained in the first ink may be a self-emulsifying resin in which a hydrophilic component necessary for being stably dispersed in water is introduced or a resin which becomes water-dispersible by the use of an external emulsifier, but the resin is preferably a self-emulsifying dispersion (self-emulsifying emulsion) having no emulsifier from the viewpoint that the reaction of a pretreatment liquid described below and the first ink is difficult to be hindered.

As the resin, for example, an acrylic resin, a styrene acrylic resin, a fluorene-based resin, a urethane-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, or an ethylene vinyl acetate-based resin can be used. These resins may be used alone or in combination of two or more kinds thereof. Among these, since flexibility of design is high and a desired coating physical property (the above-described coating elongation) can be easily obtained, it is preferable to use at least one kind selected from a urethane-based resin and an acrylic resin and more preferable to use a urethane-based resin.

As the urethane-based resin, which is not particularly limited as long as a resin has a urethane skeleton and is water dispersible, for example, commercially available products such as Superflex 460, 460s, and 840 (trade names, manufactured by Dai-ichi Kogyo Seiyaku Co., Ltd.), Resamine D-1060, D-2020, D-4080, D-4200, D-6300, and D-6455 (trade names, manufactured by Dainichiseika Color & Chemicals Mfg. Co., Ltd), Takelac WS-6021 and W-512-A-6 (trade names, manufactured by Mitsui Chemicals Polyurethane, Inc.), and Suncure 2710 (trade name, manufactured by Lubrizol Corp) may be used.

In addition, as the urethane-based resin, an anionic urethane-based resin having an anionic functional group such as a carboxy group, a sulfo group, or a hydroxyl group is preferable from the viewpoint of material compatibility to an ink jet head and improving reactivity with a polyvalent metal compound when the polyvalent metal compound is contained in a pretreatment agent described below. Among the above-described commercially available products, examples of anionic the urethane resin include Superflex 460, 460s, or 840 manufactured by Dai-ichi Kogyo Seiyaku Co., Ltd., and Takelac WS-6021, or W-512-A-6 manufactured by Mitsui Chemicals Polyurethane, Inc.

Further, as the urethane resin, a polyether type urethane resin containing an ether bond in a main chain, a polyester type urethane resin containing an ester bond in the main chain, or a polycarbonate type urethane resin containing a carbonate bond in the main chain can be used in addition to a urethane bond, which is preferable. These urethane resins may be used in combination of plural kinds thereof.

As the acrylic resin, a polymer of an acrylic monomer such as acrylic acid or acrylic acid ester; or a copolymer of an acrylic monomer and other monomers may be used, and examples of the other monomers include a vinyl-based monomer such as styrene or the like. Commercially available products may be used as the acrylic resin, and examples thereof include Mowinyl-Power 702, 7502, 7525, and 7320 (manufactured by Nippon Synthetic Chemicals Industry Co., Ltd.).

The content of the resin contained in the first ink is preferably in the range of 1% by mass to 15% by mass, more preferably in the range of 5% by mass to 15% by mass, and still more preferably in the range of 8% by mass to 15% by mass based on the total mass of the first ink, in terms of the solid content. When the content of the resin contained in the first ink is within the above-described range and is especially not lower than the lower limit thereof, since the resin can sufficiently exert an effect of improving fixation of the ink, the friction resistance of the image being recorded is improved. In addition, when the content of the resin is not higher than the upper limit thereof, since the generation of the aggregates due to the resin is suppressed, the storage stability or discharging stability of the ink becomes excellent.

1.1.3. Other Components

The first ink may include water, an organic solvent, a surfactant, a pH adjusting agent, a preservative, and a fungicide.

Water

Water is a main medium of an ink and a component which is evaporated and dispersed by drying. Examples of the water include pure water such as ion exchange water, ultrafiltrated water, reverse osmosis water, or distilled water; and water in which ionic impurities are removed as much as possible such as ultrapure water. In addition, when water is sterilized by irradiating with an ultraviolet ray or adding hydrogen peroxide, it is possible to prevent fungi or bacteria from being colonizing when the ink is preserved for a long period of time. The content of water contained in the first ink, which is not particularly limited, is preferably 50% by mass or more and more preferably in the range of 50% by mass to 95% by mass based on the total mass of the first ink.

Organic Solvent

Examples of the organic solvent include 1-2-alkanediols, polyhydric alcohols, and glycol ethers. These can be used alone or in combination of two or more kinds thereof.

Examples of the 1,2-alkanediols include 1,2-propanediol, 1,2-butanediol, 1,2-pentanediol, 1,2-hexanediol, and 1,2-octanediol. Since the 1,2-alkanediols is excellent in uniformly wetting a recording medium such as cloth by increasing the wettability of the ink, an image without bleeding can be recorded. When the 1,2-alkanediols are included, the content thereof may be in the range of 1% by mass to 20% by mass based on the total mass of the first ink.

Examples of the polyhydric alcohols include ethylene glycol, diethylene glycol, triethylene glycol, propylene glycol, dipropylene glycol, 1,3-propanediol, 1,3-butanediol, 1,3-pentanediol, 1,4-butanediol, 1,5-pentnediol, 1,6-hexanediol, 2,3-butanediol, 3-methyl-1,3-butanediol, 3-methyl-1,5-pentanediol, 2-methyl-1,3-propanediol, 2,2-dimethyl-1,3-propanediol, 2-methyl-2,4-pentanediol, trimethylol propane, and glycerin. The polyhydric alcohols can be preferably used from the viewpoint of reducing clogging or discharging defects by suppressing drying and solidification of the ink on a nozzle surface of the head. When the polyhydric alcohols are included, the content thereof may be in the range of 2% by mass to 20% by mass based on the total mass of the first ink.

Examples of the glycol ethers include alkylene glycol monoether and alkylene glycol diether.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, triethylene glycol butyl methyl ether, tetraethylene glycol dibutyl ether, propylene glycol dimethyl ether, propylene glycol diethyl ether, dipropylene glycol dimethyl ether, and dipropylene glycol diethyl ether.

Since the glycol ethers can suppress wettability or penetration speed of the ink on the recording medium, a clear image can be recorded. When the glycol ethers are included, the content thereof may be in the range of 0.05% by mass to 6% by mass based on the total mass of the first ink.

Surfactant

A surfactant has a function of improving the wettability with respect to the recording medium by reducing surface tension. Among surfactants, for example, an acetylene glycol-based surfactant, a silicone-based surfactant, and a fluorine-based surfactant may be preferably used.

Examples of the acetylene glycol-based surfactant, which are not particularly limited, include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all trade names, manufactured by Air Products and Chemicals. Inc.); Olefin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all trade names, Nissin Chemicals Co., Ltd.); and Acetylenol E00, E00P, E40, and E100 (all trade names, manufactured by Kawaken Fine Chemicals. Co., Ltd.).

As a preferable example of the silicone-based surfactant, which is not particularly limited, a polysiloxane-based compound is exemplified. As the polysiloxane-based compound, which is not particularly limited, for example, polyether-modified organosiloxane is exemplified. Examples of the commercially available products of the polyether-modified organosiloxane include BYK-306, BYK-307, BYK-333, BYK-341, BYK-345, BYK-346, and BYK-348 (all trade names, manufactured by BYK Co., Ltd.); KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemicals Co., Ltd.).

As the fluorine-based surfactant, a fluorine-modified polymer is preferably used, and, as a specific example thereof, BYK-340 (trade name, manufactured by BYK Co., Ltd.) is exemplified.

pH Adjusting Agent

Examples of the pH adjusting agent include dipotassium hydrogen phosphate, disodium hydrogen phosphate, sodium hydroxide, rithium hydroxide, potassium hydroxide, ammonia, diethanolamine, triethanolamine, triisopropanolamine, potassium carbonate, sodium carbonate, and sodium hydrogen carbonate.

Preservative and Fungicide

Examples of the preservative and fungicide include sodium benzoate, sodium pentachlorophenol, 2-pyridinethiol-1-sodium oxide, sodium sorbic acid, sodium dehydro acetate, 1,2-dibenzine thiazoline-3-one (Proxel CRL, Proxel BND, Proxel GXL, Proxel XL-2, and Proxel TN manufactured by Imperial Chemical Industries).

Others

As described below, a pretreatment agent containing a polyvalent metal compound is applied to the area of the cloth on which the first image is formed before the first image which is a base layer is formed using the first ink in some cases. When the pretreatment agent is applied in this way, by reacting the resin or the pigment contained in the first ink with the polyvalent metal compound contained in the pretreatment agent at the time of attaching the first ink to the cloth, these components contained in the first ink can be aggregated to become aggregates. By doing this, it is possible to improve the coloring property on the recording medium of the first image (base layer) formed of the first ink and excellently conceal the cloth.

On the other hand, when a particular emulsifier (an anionic emulsifier represented by the general formula (1) or a nonionic emulsifier whose HLB value is 12 or more, which is represented by the general formula (2)) contained in the second ink described below is included in the first ink in an amount of more than or equal to a predetermined amount, these emulsifiers may inhibit the reaction of the polyvalent metal compound contained in the pretreatment agent with the resin or the pigment contained in the first ink in some cases. As a result, the generation of the aggregates is inhibited, and the pigment is penetrated to the cloth, so the concealing property of the cloth tends to be significantly degraded.

From these viewpoints, in the first ink, it is preferable that the content of the particular emulsifier (an anionic emulsifier represented by the general formula (1) or a nonionic emulsifier whose HLB value is 12 or more, which is represented by the general formula (2)) contained in the second ink be less than the predetermined amount.

In addition, the expression "the content of the particular emulsifier is less than the predetermined amount" means that the particular emulsifier is included within the range in which the above-described defects are not generated, and specifically, the particular emulsifier is not included in an amount of equal to or more than 0.03% by mass, that is, the content of the particular emulsifier is less than 0.03% by mass (including 0% by mass). In some cases, this means that the particular emulsifier is not substantially included.

Further, when the pigment contained in the first ink is a white-based pigment such as titanium oxide, the white-based pigment is easily precipitated in the ink flow channel of an ink jet recording apparatus. Accordingly, for the purpose of removing the precipitate of the pigment, the ink flow channel supplying the first ink to the nozzle or the nozzle used to discharge the first ink is regularly washed or a system for circulating the ink in order to prevent the precipitate from being generated is provided in many cases. In this case, the aggregates are not a problem when compared to the case in which a pigment other than the white-based pigment is used because the aggregates generated due to the resin are removed by washing the ink flow channel or the aggregates generated due to the resin are redissolved to be decreased during the circulation of the ink. Therefore, in the case in which the pigment contained in the first ink is a white pigment, the first ink may not substantially include the particular emulsifier.

1.2. Second Ink

The second ink contained in the inkset for ink jet textile printing according to the present embodiment includes a pigment, a resin, and an emulsifier.

Since the second ink is used by being attached on the image formed by the first ink, an image with excellent visibility can be formed as described above.

Hereinafter, the components contained in the second ink will be described in detail.

1.2.1. Pigment

Both an organic pigment and an inorganic pigment can be used as the pigment contained in the second ink. As long as the pigment contained in the second ink is selected to have a different hue from that of the first ink described above, a white-based pigment (white pigment) described above or a pigment other than the white-based pigment can be used as the pigment contained in the second ink.

Any color of pigment can be used for the second ink, but in the case in which the inkset for ink jet textile printing according to the present embodiment is used for recording on the cloth having low brightness, it is preferable to use a white-based pigment for the first ink and to use a pigment other than the white-based pigment for the second ink. This is because the visibility of the image formed by the second ink can be improved even when the cloth with low brightness is used.

Since specific examples of the pigment which can be used for the second ink are the same as those exemplified in the first ink, the description will not be repeated. The pigment contained in the second ink is preferably a color pigment such as a color organic pigment or a black pigment such as a carbon black pigment.

The content of the pigment contained in the second ink is preferably in the range of 0.1% by mass to 15% by mass, more preferably in the range of 1% by mass to 15% by mass, and still more preferably in the range of 1% by mass to 10% by mass based on the total mass of the second ink from the viewpoint of securing excellent coloring properties of the pigments, which are different from one another depending on the kind of pigment being used.

1.2.2. Resin

The second ink contains a resin. Since the adhesion between the second ink and the cloth can be improved by containing a resin, the friction resistance of the image to be formed of the second ink can be improved.

Since the kinds, characteristics, effects and the like of the resin contained in the second ink are the same as those of the resin contained in the first ink described in the section of "1.1.2. Resin", the description will not be repeated.

The content of the resin contained in the second ink is preferably in the range of 1% by mass to 15% by mass, more preferably in the range of 3% by mass to 15% by mass, and still more preferably in the range of 5% by mass to 10% by mass based on the total mass of the second ink, in terms of the solid content. When the content of the resin contained in the second ink is within the above-described range and is especially not lower than the lower limit thereof, since the resin can sufficiently exert an effect of improving fixation of the ink, the friction resistance of the image being recorded is improved. In addition, when the content of the resin is not higher than the upper limit thereof, since the generation of the aggregates (foreign substances) due to the resin is suppressed, the storage stability or discharging stability of the ink becomes excellent.

1.2.3. Emulsifier

The second ink includes at least one kind of emulsifier selected from an anionic emulsifier represented by the following general formula (1) (hereinafter, also referred to as an "emulsifier A") and a nonionic emulsifier, represented by the following general formula (2), whose HLB value is 12 or more (hereinafter, also referred to as an "emulsifier B").

Both the emulsifier A and the emulsifier B have a function of suppressing the generation of aggregates due to the resin. The specific mechanism is not yet clear, but it is assumed that the film formation (particularly, the film formation of the resin at the gas-liquid interface) of the resin, which is the reason that the aggregates are generated, can be delayed and the generation of the aggregates (foreign substances) due to the resin can be suppressed by adsorbing the emulsifiers A and B to the resin.

The content of the emulsifier contained in the second ink is preferably in the range of 0.03% by mass to 0.3% by mass, more preferably in the range of 0.04% by mass to 0.29% by mass, and still more preferably in the range of 0.1% by mass to 0.29% by mass based on the total mass of the ink. When the content of the emulsifier contained in the second ink is within the above-described range and is especially not lower than the lower limit, the generation of the aggregates due to the resin can be sufficiently suppressed. Further, when the content of the emulsifier is not higher than the upper limit, it is possible to suppress penetration of the second ink into the image formed by the first ink, thereby obtaining an image with less bleeding.

Emulsifier A

The emulsifier A is an anionic emulsifier having a structure represented by the following general formula (1).

$$R^1\text{—O—}(CH_2\text{—}CH_2\text{—O})_n\text{-A} \qquad (1)$$

In the general formula (1), $R^1$ represents a substituted or unsubstituted hydrocarbon group having 18 or more carbon atoms, A represents a —$SO_3M$ group, a —$PO_3HM$ group, or a —$CH_2COOM$ group, M represents alkali metal, ammonium, or alkanolamine, and n represents an integer from 2 to 20.

In the general formula (1), the number of carbon atoms of the hydrocarbon group representing $R^1$ is 18 or more, preferably in the range of 18 to 30, and still more preferably in the range of 18 to 25. When the number of carbon atoms of $R^1$ is 18 or more, the generation of aggregates due to the resin can be sufficiently suppressed. In addition, when the number of carbon atoms of $R^1$ is 30 or lower, the viscosity of the ink can be maintained in an appropriate range and the discharging stability of the ink becomes excellent. On the other hand, when the number of carbon atoms of $R^1$ is lower than 18, the generation of aggregates due to the resin cannot be suppressed and the discharging stability of the ink tends to be degraded.

As the hydrocarbon group representing $R^1$, a saturated or unsaturated hydrocarbon group such as an alkyl group or an alkenyl group is exemplified. Among these, an unsaturated hydrocarbon group is preferable in terms of suppressing the generation of aggregates.

In addition, in the hydrocarbon group representing $R^1$, a part of a hydrogen atom may be substituted with a substituent, and examples thereof include an ether group, an ester group, or an aromatic hydrocarbon group.

A represents a —$SO_3M$ group, a —$PO_3HM$ group, or a —$CH_2COOM$ group, but a —$SO_3M$ group is preferable in terms of storage stability of the ink or the like.

Specific examples of the alkali metal representing M include Na and K, and specific examples of the alkanolamine representing M include triethanolamine.

Here, n is an integer from 2 to 20, preferably an integer from 2 to 15, and more preferably from 2 to 10. When n is in the above-described range, the degradation of the storage stability of the second ink tends to be suppressed. On the other hand, when n exceeds 20, since the hydrophilic property is increased, the defects in which the ink is easily foamed or a deforming property is degraded may occur in some cases.

As the emulsifier A, a commercially available product may be used, and examples thereof include Latemul WX or Rebenoru WX (both trade names, manufactured by Kao Corporation).

Emulsifier B

The emulsifier B is a nonionic emulsifier having a chemical structure represented by the following general formula (2) and whose HLB value is 12 or more.

$$R^2\text{—O—}(CH_2\text{—}CH_2\text{—O})_m\text{—H} \qquad (2)$$

In the general formula (2), $R^2$ represents a substituted or unsubstituted hydrocarbon group having 16 or more carbon atoms and m represents an integer from 2 to 20.

In the general formula (2), the number of carbon atoms of the hydrocarbon group representing $R^2$ is 16 or more, preferably in the range of 16 to 30, and more preferably in the range of 18 to 25. When the number of carbon atoms of $R^2$ is 16 or more, the generation of aggregates due to the resin can be sufficiently suppressed. In addition, when the number of carbon atoms of $R^2$ is 30 or more, the viscosity of the ink can be maintained in an appropriate range and the discharging stability of the ink becomes excellent. On the other hand, when the number of carbon atoms of $R^2$ is lower than 16, the generation of aggregates due to the resin cannot be suppressed and the discharging stability of the ink tends to be degraded.

As the hydrocarbon group representing $R^2$, a saturated or unsaturated hydrocarbon group such as an alkyl group or an alkenyl group is exemplified. Among these, an unsaturated hydrocarbon group is preferable in terms of suppressing the generation of aggregates.

In addition, in the hydrocarbon group representing $R^2$, a part of a hydrogen atom may be substituted with a substituent, and examples thereof include an ether group, an ester group, or an aromatic hydrocarbon group.

Here, m is an integer from 2 to 20, more preferably an integer from 2 to 15, and still more preferably an integer from 2 to 10. When m is in the above-described range, the degradation of the storage stability of the second ink tends to be suppressed. On the other hand, when m exceeds 20, since the hydrophilic property is increased, the defects in which the ink is easily foamed or a deforming property is degraded may occur in some cases.

The emulsifier B has the above-described chemical structure and the HLB value of the emulsifier B is 12 or more, preferably in the range of 12 to 18 and more preferably in the range of 12 to 17. When the HLB value is 12 or more, the generation of aggregates due to the resin can be sufficiently suppressed. In addition, when $R^2$ is 18 or less, the dispersibility of the emulsifier in the ink becomes excellent and an ink with excellent storage stability can be obtained. On the other hand, when the HLB value is less than 12, the generation of aggregates due to the resin cannot be suppressed and the discharging stability of the ink tends to be degraded.

Further, the HLB value in the present specification is a value calculated by the following formula (3) from the ratio of a non-polar value (I) to an organic value (O) (hereinafter, also simply referred to as an "I/O value") in an organic conceptual diagram.

$$\text{HLB value: (Non-polar value (I)/Organic value (O))} \times 10 \quad (3)$$

Specifically, the I/O value can be calculated based on each of the following literature "Systematic Organic Quantitative Analysis, Mixture Part" written by Fujita Atsushi, published by Kazamashobo, 1974; "Dyeing Theoretical Chemistry" written by Kuroki Nobuhiko, published by Makishoten, 1966; and "Organic Compound Separation Method" written by Inoue Hiroo, published by Shokabo, 1990.

As the emulsifier B, a commercially available product can be used, and examples thereof include Newcol 1860 and Newcol 1210 (both trade names, manufactured by Nippon Nyukazai Co., Ltd.).

1.2.4. Other Components

The second ink may include components such as water, an organic solvent, a surfactant, a pH adjusting agent, a preservative, and a fungicide. The components exemplified in the section of "1.1.3. Other components" above can be used as those components and the contents thereof are the same as those described above, so the description thereof will not be repeated.

1.3. Preparation Method

Each ink (first ink and second ink) contained in the inkset for ink jet textile printing according to the present embodiment can be obtained by mixing the above-described components in an arbitrary order and removing impurities by filtration or the like as needed. As the method of mixing each component, a method of stirring and mixing materials by sequentially adding the materials to a container equipped with a stirrer such as a mechanical stirrer or a magnetic stirrer is preferably used. As the filtration method, a centrifugal filtration or a filter filtration can be performed as needed.

1.4. Physical Property

The surface tension of each ink contained in the inkset for ink jet textile printing according to the present embodiment at a temperature of 20° C. is preferably in the range of 20 mN/m to 40 mN/m and more preferably in the range of 25 mN/m to 35 mN/m from the viewpoint of balancing between the image quality and the reliability as the ink for ink jet textile printing. Further, the surface tension can be measured by confirming the surface tension at the time of wetting a platinum plate with the ink in the environment of a temperature of 20° C. using an Automatic Surface Tension Analyzer CBVP-Z (trade name, manufactured by Kyowa Interface Science Co., Ltd.).

Further, from these viewpoints, the viscosity of each ink contained in the inkset for ink jet textile printing according to the present embodiment at a temperature of 20° C. is preferably in the range of 3 mPa·s to 10 mPa·s and more preferably in the range of 3 mPa·s to 8 mPa·s. In addition, the measurement of the viscosity can be performed by measuring the viscosity in the environment of a temperature of 20° C. using a viscoelasticity tester MCR-300 (trade name, manufactured by Physica Co., Ltd.).

2. Ink Jet Textile Printing Method

The ink jet textile printing method according to an embodiment of the invention is performed using the above-described inkset for ink jet textile printing and includes a first image forming process of forming a first image formed by a first ink by attaching the first ink to the cloth and a second image forming process of forming a second image formed by a second ink by attaching the second ink to the first image.

More specifically, the ink jet textile printing method according to the present embodiment may include a pretreatment process of applying a pretreatment agent containing a polyvalent metal compound to the range of the cloth in which the first image is formed, before the first image forming process.

As described above, the inkset for ink jet textile printing can suppress the generation of aggregates and improve the fixation of the image being recorded. For this reason, an image with excellent discharging property of an ink and excellent friction resistance can be formed with the ink jet textile printing method using the inkset according to the present embodiment.

Examples of the cloth used for the ink jet textile printing method according to the invention, which are not particularly limited, include fabrics, knitting, and non-woven fabrics using natural fibers such as silk, cotton and wool; and synthetic fibers such as nylon, polyester, polypropylene, and rayon as raw materials.

In the ink jet textile printing method, each ink constituting the inkset is loaded in an ink jet recording apparatus to be used. As the ink jet recording apparatus, which is not particularly limited, for example, a drop-on-demand type ink jet recording apparatus may be exemplified. The drop-on-demand type ink jet recording apparatus includes an apparatus to which a piezoelectric element recording method of recording with a piezoelectric element which is arranged at a recording head is applied; and an apparatus to which a heat jet recording method of recording using thermal energy generated by a heater of a heating resistor element which is arranged at the recording head is applied, accordingly either method may be adopted.

Hereinafter, each process will be described in detail.

2.1. Pretreatment Process

It is preferable that the ink jet textile printing method according to the present embodiment include a pretreatment process. The pretreatment process is a process of applying a pretreatment agent containing a coagulant which reacts with the components of an ink to the range of the cloth in which the first image is formed before the first image forming process. Examples of the components contained in the ink which react with the coagulant include the above-described pigments and resins.

The coagulant has a function of aggregating pigments contained in the first ink by being reacted with the resin contained in the first ink. In this way, the coloring property of the first image formed by the first ink is improved, and the cloth can be concealed in an excellent manner. Polyvalent metal salts are preferable as the coagulant, but are not limited thereto.

The pretreatment process may include a process of immersing the cloth in a pretreatment agent or a process of coating or spraying the pretreatment agent.

In addition, the ink jet textile printing method according to the present embodiment may include a process of drying the pretreatment agent applied to the cloth, after the pretreatment process and before the first image forming process. As a drying unit of drying the pretreatment agent, a known unit may be used, but the example is not particularly limited.

The polyvalent metal compound is a compound formed of polyvalent metal ion whose valence is 2 or more and anion. Examples of the polyvalent metal ion whose valence is 2 or more include $Ca^{2+}$, $Mg^{2+}$, $Cu^{2+}$, $Ni^{2+}$, $Zn^{2+}$, and $Ba^{2+}$. Examples of anion include $Cl^-$, $NO_3^-$, $CH_3COO^-$, $I^-$, $Br^-$, and $ClO_3^-$. Among these, magnesium salts, calcium salts, or ammonium salts can be preferably used from the viewpoint of further improving the above-described effects of aggregating. Other examples of the coagulant being used include organic acids, polyallylamine, and a polyallylamine derivative.

The pretreatment agent may include a resin. Examples of the resin, which are not particularly limited, include known resins such as an acrylic resin, a styrene acrylic resin, a fluorene-based resin, a urethane-based resin, a polyolefin-based resin, and a vinyl ethylene acetate-based resin.

The pretreatment agent may contain components such as a surfactant, a paste (for example, a starch substance, a cellulose-based substance, polysaccharides, a protein, or a water-soluble polymer), organic acids, water, a pH adjusting agent, a preservative, and a fungicide.

Further, in the ink jet textile printing method according to the present embodiment, when the pretreatment process is not performed, the cloth in which a coagulant is applied to the recording surface in advance may be used.

2.2. First Image Forming Process

The first image forming process is a process of forming a first image formed by the above-described first ink by attaching the first ink to the cloth. The first image is used as a base layer (background image) of a second image, but the first image may have an area in which the second image is not formed.

In the first image forming process, the amount of the first ink attached to the cloth is preferably 100 mg/inch$^2$ or more, more preferably 150 mg/inch$^2$ or more, and still more preferably 180 mg/inch$^2$ or more. When the amount of the first ink attached to the cloth is 100 mg/inch$^2$ or more, an image with an excellent concealing property can be formed. In addition, when the amount of the first ink attached to the cloth is 300 mg/inch$^2$ or less, the shielding property becomes sufficient and the used amount of the first ink can be saved.

The amount of the first ink attached to the cloth can be calculated by dividing the total discharged amount (mg) of the first ink used to form the first image by the area (inch$^2$) of the first image.

2.3. Second Image Forming Process

The second image forming process is a process of forming a second image formed by the above-described second ink by attaching the second ink to the first image. By performing this process, the visibility of the second image can be improved.

In a case in which the mass of a volatile component contained in the first ink used to record the first image is set to 100%, it is preferable to perform the second image forming process when the mass (residual rate) of the volatile component remaining in the first image after a part of the volatile component is volatized is 30% or more, more preferably in the range of 30% to 90%, and still more preferably in the range of 40% to 80%. When the process is performed at the time in which the mass of the volatile component contained in the first image is within the above-described range, the adhesion between the first image and the second image is improved and color mixture of the first image and the second image can be suppressed. Further, it is possible to obtain a clear image with less bleeding and improve printing speed because the second image forming process can be started early. At this time, when the aggregates generated by reacting the component of the first ink and the pretreatment agent are formed in the first image, the bleeding of the second ink can be suppressed and the coloring property thereof can be improved. In addition, the volatile component indicates the above-described water and organic solvent.

The mass of the volatile component contained in the first image can be calculated based on the total discharged amount (mg) of the first ink used to form the first image. That is, when the value obtained by subtracting the mass of the first image after the volatile component is completely volatized by drying the first image from the total discharged amount of the first ink used to form the first image is set to a mass (mass A) of the volatile component contained in the first ink used to record the first image, and the value obtained by subtracting the mass of the first image after the volatile component is completely volatized by drying the first image from the mass of the first image at the time of starting the second image forming process is set to a residual amount (mass B) of the volatile component remained in the first image at the time of starting the second image forming process, a percentage of rate of the mass B to the mass A is a residual rate of the volatile component contained in the first ink used to record the first image at the time of starting the second image forming process.

In order for the mass of the first image to be in the above-described range, a predetermined drying process may be performed after the first image is formed. The predetermined drying process may be performed by natural drying or by a known drying unit, and may be performed by adjusting the drying temperature or the drying time. When the residual rate (mass B) of the volatile component remaining in the first image at the time of starting the second image forming process is measured, the predetermined drying process may be performed after the first image forming process and the mass of the first image may be measured at the time point in which the drying state thereof becomes the same as the drying state at the starting of the actual second image forming process.

2.4. Heating Process

The ink jet textile printing method according to the present embodiment may include a heating process of heating the cloth, which is performed after the second image forming process. In other words, the heating process is a process of drying the first image and the second image formed on the cloth. By performing this process, an image with excellent friction resistance can be obtained because the resin contained in each ink sufficiently forms a film.

Examples of the heating method used for the heating process, which are not particularly limited, include a heat press method, a normal pressure steam method, a high pressure steam method, and a thermofix method. In addition, as a source of heat, which is not particularly limited to the following, for example, infrared light (lamp) is exemplified. Further, the temperature at the time of heating process may be set to, for example, about 150° C. to 200° C., which is the temperature range in which the resin contained in each ink can be fused and moisture can be volatized.

After the heating process, the printed matters may be washed and dried. At this time, a soaping process, that is, a process of washing off the non-fixed pigment with a heated soap liquid may be performed as needed.

3. Examples

Hereinafter, the embodiments of the invention will be further specifically described with reference to examples, but the present embodiments are not limited to the examples.

3.1. Preparation of Ink
3.1.1. Preparation of First Ink (White-Based Ink)

The first ink is a white-based ink containing a white-based pigment and prepared using a pigment dispersing liquid.

The pigment dispersing liquid used for the first ink was prepared as follows. 250 g of a white-based pigment ("R62N" (trade name), manufactured by Sakai Chemical Industry Co., Ltd., titanium oxide) and 10 g (2.5 g as an effective component) of a pigment dispersant "Demol EP" (manufactured by Kao Chemicals) were mixed with 740 g of ion exchange water, and 0.5 mmϕ of zirconia beads were dispersed under the condition of at a filling rate of 80% and for a dwell time of 2 minutes using a bead mill (manufactured by Shinmaru Enterprises Corporation, DYNO-MILL KDL A type), thereby obtaining a pigment dispersing liquid (pigment content 25%) for the first ink.

Subsequently, each component was put into a container such that the components have the compositions as listed in Table 1, stirred and mixed with a magnetic stirrer for 2 hours using the pigment dispersing liquid for the first ink, and then the resultant was filtered with a membrane filter having a pore size of 5 μm. In this way, a first ink A and a first ink B were obtained. Further, all the numerical values in Table 1 are on a % by mass basis, and the ion exchange water was added such that the total mass of the ink became 100% by mass.

TABLE 1

| White-based ink (first ink) | | A | B |
|---|---|---|---|
| Pigment | White-based pigment | 8.00 | 8.00 |
| Resin | Takelac WS-6021 | 26.70 | 26.70 |
| | Superflex 150 | | |
| | Superflex 126 | | |
| Emulsifier | Newcol 1860 | | 0.10 |
| | Newcol 1210 | | |
| | Latemul WX | | |
| | Rebenoru WX | | |
| | Newcol 1204 | | |
| | Newcol 1006 | | |
| | Newcol 1020 | | |
| | Latemul E-150 | | |
| Other components | Glycerin | 7.00 | 7.00 |
| | Triethylene glycol | 3.00 | 3.00 |
| | Triethylene glycol monobutyl ether | 1.00 | 1.00 |
| | BYK-348 | 0.30 | 0.30 |
| | Ion exchange water | Residual amount | Residual amount |
| | Total (% by mass) | 100 | 100 |

3.1.2. Preparation of Second Ink

The second ink is a color ink containing a magenta pigment and was prepared using a pigment dispersing liquid.

The pigment dispersing liquid used for the second ink was prepared as follows. 7.5 parts by mass of an acrylic acid-acrylic acid ester copolymer (weight average molecular weight: 25000, acid value: 180) as a resin dispersant was added to 76 part by mass of ion exchange water, in which 1.5 parts by mass of a 30% ammonia aqueous solution (neutralizing agent) was dissolved, and then dissolved therein. Subsequently, 15 parts by mass of a magenta pigment (C.I. Pigment Red 122) was added thereto and a dispersing treatment is performed in a ball mill using zirconia beads for 10 hours, thereby obtaining a pigment dispersing liquid for the second ink (pigment content 15%).

Subsequently, each component was put into a container such that the components have the compositions as listed in Tables 2 and 3, stirred and mixed with a magnetic stirrer for 2 hours using the pigment dispersing liquid for the second ink, and then the resultant was filtered with a membrane filter having a pore size of 5 μm. In this way, second inks A to T were obtained. Further, all the numerical values in Tables 2 and 3 are on a % by mass basis, and the ion exchange water was added such that the total mass of the ink became 100% by mass.

TABLE 2

| Color ink (second ink) | | A | B | C | D | E | F | G |
|---|---|---|---|---|---|---|---|---|
| Pigment | Magenta pigment | 5.00 | 5.00 | 5.00 | 5.00 | 5.00 | 5.00 | 5.00 |
| Resin | Takelac WS-6021 | 22.00 | 22.00 | 22.00 | 22.00 | 22.00 | | |
| | Superflex 150 | | | | | | 22.00 | |
| | Superflex 126 | | | | | | | 22.00 |
| Emulsifier | Newcol 1860 | 0.02 | 0.04 | 0.10 | 0.29 | 0.40 | 0.02 | 0.02 |
| | Newcol 1210 | | | | | | | |
| | Latemul WX | | | | | | | |
| | Rebenoru WX | | | | | | | |
| | Newcol 1204 | | | | | | | |
| | Newcol 1006 | | | | | | | |
| | Newcol 1020 | | | | | | | |
| | Latemul E-150 | | | | | | | |
| Other components | Glycerin | 8.00 | 8.00 | 8.00 | 8.00 | 8.00 | 8.00 | 8.00 |
| | Triethylene glycol | 3.00 | 3.00 | 3.00 | 3.00 | 3.00 | 3.00 | 3.00 |
| | Triethylene glycol monobutyl ether | 1.00 | 1.00 | 1.00 | 1.00 | 1.00 | 1.00 | 1.00 |
| | BYK-348 | 0.30 | 0.30 | 0.30 | 0.30 | 0.30 | 0.30 | 0.30 |
| | Ion exchange water | Residual amount | Residual amount | Residual amount | Residual amount | Residual amount | Residual amount | Residual amount |
| | Total (% by mass) | 100 | 100 | 100 | 100 | 100 | 100 | 100 |
| Evaluation test | Aggregates as gas-liquid interface | Δ | ○ | ◎ | ◎ | ◎ | ○ | ◎ |

| Color ink (second ink) | | H | I | J | K | L | M | N |
|---|---|---|---|---|---|---|---|---|
| Pigment | Magenta pigment | 5.00 | 5.00 | 5.00 | 5.00 | 5.00 | 5.00 | 5.00 |
| Resin | Takelac WS-6021 | 22.00 | 22.00 | 22.00 | 22.00 | 22.00 | 22.00 | 22.00 |
| | Superflex 150 | | | | | | | |
| | Superflex 126 | | | | | | | |

TABLE 2-continued

| Category | Component | | | | | | | |
|---|---|---|---|---|---|---|---|---|
| Emulsifier | Newcol 1860 | | | | | | | |
| | Newcol 1210 | 0.10 | | | | | | |
| | Latemul WX | | 0.02 | 0.04 | 0.10 | 0.29 | 0.40 | |
| | Rebenoru WX | | | | | | | 0.10 |
| | Newcol 1204 | | | | | | | |
| | Newcol 1006 | | | | | | | |
| | Newcol 1020 | | | | | | | |
| | Latemul E-150 | | | | | | | |
| Other components | Glycerin | 8.00 | 8.00 | 8.00 | 8.00 | 8.00 | 8.00 | 8.00 |
| | Triethylene glycol | 3.00 | 3.00 | 3.00 | 3.00 | 3.00 | 3.00 | 3.00 |
| | Triethylene glycol monobutyl ether | 1.00 | 1.00 | 1.00 | 1.00 | 1.00 | 1.00 | 1.00 |
| | BYK-348 | 0.30 | 0.30 | 0.30 | 0.30 | 0.30 | 0.30 | 0.30 |
| | Ion exchange water | Residual amount | Residual amount | Residual amount | Residual amount | Residual amount | Residual amount | Residual amount |
| | Total (% by mass) | 100 | 100 | 100 | 100 | 100 | 100 | 102 |
| Evaluation test | Aggregates as gas-liquid interface | ○ | Δ | ○ | ⊚ | ⊚ | ⊚ | ○ |

TABLE 3

| Category | Color ink (second ink) | O | P | Q | R | S | T |
|---|---|---|---|---|---|---|---|
| Pigment | Magenta pigment | 5.00 | 5.00 | 5.00 | 5.00 | 5.00 | 5.00 |
| Resin | Takelac WS-6021 | 22.00 | 22.00 | 22.00 | 22.00 | | 22.00 |
| | Superflex 150 | | | | | | |
| | Superflex 126 | | | | | | |
| Emulsifier | Newcol 1860 | | | | | | |
| | Newcol 1210 | | | | | | |
| | Latemul WX | | | | | | |
| | Rebenoru WX | | | | | | |
| | Newcol 1204 | 0.10 | | | | | |
| | Newcol 1006 | | 0.10 | | | | |
| | Newcol 1020 | | | 0.10 | | | |
| | Latemul E-150 | | | | 0.10 | | |
| Other components | Glycerin | 8.00 | 8.00 | 8.00 | 8.00 | 13.00 | 8.00 |
| | Triethylene glycol | 3.00 | 3.00 | 3.00 | 3.00 | 3.00 | 3.00 |
| | Triethylene glycol monobutyl ether | 1.00 | 1.00 | 1.00 | 1.00 | 1.00 | 1.00 |
| | BYK-348 | 0.30 | 0.30 | 0.30 | 0.30 | 0.30 | 0.30 |
| | Ion exchange water | Residual amount | Residual amount | Residual amount | Residual amount | Residual amount | Residual amount |
| | Total (% by mass) | 100 | 100 | 100 | 100 | 100 | 100 |
| Evaluation test | Aggregates at gas-liquid interface | X | X | X | X | ⊚ | X |

In Tables 1 to 3, the components described other than the compound names are as follows.

<Pigment>
White-based pigment ("R62N" (trade name), manufactured by Sakai Chemical Industry Co., Ltd., titanium oxide)
Magenta pigment (C.I. Pigment Red 122)

<Resin>
Takelac WS-6021 (trade name, manufactured by Mitsui Chemicals Polyurethane, Inc., anionic ether-based urethane resin emulsion, self-emulsifying type, solid content 30%, coating elongation 750%)
Superflex 150 (trade name, manufactured by Dai-ichi Kogyo Seiyaku Co., Ltd., anionic ester ether type urethane resin aqueous dispersion, self-emulsifying type, solid content 30%, coating elongation 330%)
Superflex 126 (trade name, manufactured by Dai-ichi Kogyo Seiyaku Co., Ltd., anionic ester ether type urethane resin aqueous dispersion, self-emulsifying type, solid content 30%, coating elongation 87%)

<Emulsifier>
Newcol 1860 (trade name, manufactured by Nippon Nyukazai Co., Ltd., polyoxyethylene stearyl ether, HLB value: 18.1, nonionic emulsifier)
Newcol 1210 (trade name, manufactured by Nippon Nyukazai Co., Ltd., polyoxyethylene oleyl ether, HLB value: 12.4, nonionic emulsifier)
Newcol 1204 (trade name, manufactured by Nippon Nyukazai Co., Ltd., polyoxyethylene oleyl ether, HLB value: 7.9, nonionic emulsifier)
Newcol 1006 (trade name, manufactured by Nippon Nyukazai Co., Ltd., polyoxyethylene 2-ethylhexyl ether, HLB value: 13.4, nonionic emulsifier)
Newcol 1020 (trade name, manufactured by Nippon Nyukazai Co., Ltd., polyoxyethylene 2-ethylhexyl ether, HLB value: 17.4, nonionic emulsifier)
Latemul WX (trade name, manufactured by Kao Corporation, sodium polyoxyethylene oleyl ether sulfate, anionic emulsifier)
Rebenoru WX (trade name, manufactured by Kao Corporation, sodium polyoxyethylene oleyl ether sulfate, anionic emulsifier)
Latemul E-150 (trade name, manufactured by Kao Corporation, sodium polyoxyethylene lauryl ether sulfate, anionic emulsifier)

<Others>
BYK-348 (trade name, manufactured by BYK Co., Ltd., silicone-based surfactant)

Further, the coating elongation of the resin obtained using a Tensilon universal tester RTC-1225A (trade name, manufactured by Orientec Co., Ltd.) with the method described above.

3.2. Preparation of Pretreatment Agent

The pretreatment agent was prepared as follows. 15% by mass of calcium chloride, 0.1% by mass of a surfactant ("BYK-348" (trade name), manufactured by BYK Co., Ltd.), 10% by mass of Mowinyl-Power 966A (trade name, manufactured by Nippon Synthetic Chemicals Industry Co., Ltd.), and ion exchange water (residual part) were mixed together such as the total content becomes 100% by mass, and then the pretreatment agent was obtained. In addition, the blending amount of each component was converted as a solid content.

3.3. Evaluation Test 3.3.1. Aggregates at Gas-Liquid Interface

The second inks A to T obtained as described above were measured in an amount of 10 cc for each ink, and the inks were sealed in a 20 cc glass bottle, and then maintained at 40° C. for 3 days. Subsequently, each of the sealed inks were filtered with a filter having a pore size of 10 μm, and the aggregates generated due to the resin were visually observed. The evaluation criteria are as follows and the evaluation results are listed in Tables 4 and 5.

◉: No aggregates due to the resin
○: The number of aggregates due to the resin is from 1 to less than 20
Δ: The number of aggregates due to the resin is from 20 to less than 50
x: The number of aggregates due to the resin is 50 or more 3.3.2. Friction Resistance Preparation of Printed Matter When the friction resistance was tested, printed matters were produced. Firstly, the pretreatment agent prepared as described above was uniformly coated on a 100% cotton T-shirt (Heavy weight, manufactured by HANES Inc., 100% cotton, black texture) using a roller such that the amount of the agent became 20 g per A4 size, and the resultant was subjected to a heat treatment using a heat press machine at 160° C. for 1 minute (pretreatment process).

Subsequently, the above-described inks were attached to the cloth using an ink jet recording apparatus ("Epson MJ-3000C" (trade name), manufactured by Seiko Epson Corp.). Specifically, after the cloth was carried in the ink jet recording apparatus, the first ink was attached on the cloth, and the first image (white base layer) formed of the first ink was printed (first image forming process). Further, the cloth on which the first image was formed was carried in the ink jet recording apparatus again, and the second ink was attached to a part of area of the first image, and then the second image was printed (second image forming method).

Next, a printed matter was obtained by performing a heat treatment using a heat press machine at 160° C. for 1 minute (heating process).

As the printing condition, recording resolution was set to 1440 dpi×1440 dpi. In addition, the first image was recoated in four layers of a beta pattern image, and the attached amount of the first ink was set to 160 mg/inch$^2$ to 220 mg/inch$^2$. The second image was formed by setting the attached amount of the second ink to 20 mg/inch$^2$. The term "beta pattern image" in the present specification means an image in which dots are recorded with respect to an entire pixel as a minimum recording unit area defined by the recording resolution.

Further, the combination of the first ink and the second ink (inkset) in each embodiment and each comparative example is as follows as listed in Tables 4 and 5. In addition, the pretreatment process was not performed in Example 18.

Evaluation Test of Friction Resistance

The printed matter obtained as described above was washed with water, and was sufficiently dried, and then a friction fastness test of rubbing 150 times with a 200 g load using a color fastness rubbing tester AB-301S manufactured by Tester Sangyo Co., Ltd. was performed. The friction resistance was evaluated on the basis of the dryness in conformity to Japanese Industrial Standard (JIS) JIS L0849 which verifies the degree of peeling of the ink. The evaluation criteria are as follows and the evaluation results are listed in tables 4 and 5.

◉: friction fastness was a level of three of more
○: friction fastness was less than a level of three 3.3.3. Bleeding The interface between the first image and the second image was visually observed using the printed matter obtained in the same manner as that described in the above section "3.3.2. Friction resistance <preparation of printed matter>," and the state of the bleeding in the second image was evaluated. The evaluation criteria are as follows and the evaluation results are listed in Tables 4 and 5.

◉: Bleeding was not verified
○: Bleeding was slightly verified
x: Bleeding was clearly verified 3.3.4. OD Value The OD value of the second image was measured with a color measuring machine ("GRETAG MACBETH SPECTROLINO" (trade name), manufactured by X-Rite, Inc.) using the printed matter obtained in the same manner as that described in the above section "3.3.2. Friction resistance <preparation of printed matter>." The evaluation criteria are as follows and the evaluation results are listed in Tables 4 and 5.

◉: OD value was 1.2 or more
○: OD value was from 1.0 to less than 1.2
x: OD value was less than 1.0

3.3.5. Concealing Property

The concealing property was measured using the printed matter obtained in the same manner as that described in the above section "3.3.2. Friction resistance <preparation of printed matter>." The evaluation of the concealing property was performed by measuring an L* value of the area of the first image in which the second image was not formed using a color measuring machine ("GRETAG MACBETH SPECTROLINO" (trade name), manufactured by X-Rite, Inc.) based on the L* value. The evaluation criteria are as follows and the evaluation results are listed in Tables 4 and 5.

A: L* value was 94 or more
B: L* value was from 90 less than 94
C: L* value is less than 90

3.3.6. Tension Test

The following tension test was performed in order to examine the influence of the coating elongation of the resin contained in the ink.

Preparation of Printed Matter

An image was formed by attaching each of a second ink A, second ink F, and second ink G to a 20 cm×20 cm area of the cloth (Heavy weight, manufactured by HANES Inc., 100% cotton, blue texture) using an ink jet recording apparatus ("Epson MJ-3000C" (trade name), manufactured by Seiko Epson Corp.). Subsequently, a printed matter was obtained by performing a heat treatment using a heat press machine at 160° C. for 1 minute. As the printing condition, recording resolution was set to 1440 dpi×1440 dpi. In addition, the image was recoated on four layers of a beta pattern image, and the attached amount of the ink was set to 200 mg/inch².

Tension Test

In the image of the obtained printed matter, the centers of two sides facing each other were stretched to the opposite directions and the length of the cloth was extended by 1.5 times. Subsequently, the generation condition of cracks of the image was verified by visually observing the image surface. The evaluation criteria are as follows and the evaluation results are listed in Table 6.

A: cracks were not generated
B: cracks were slightly generated
C: cracks were significantly generated 3.3.7. Evaluation Results The results of the above-described evaluation tests are listed in Tables 4 to 6.

TABLE 4

|  |  | Example 1 | Example 2 | Example 3 | Example 4 | Example 5 | Example 6 | Example 7 | Example 8 | Example 9 |
|---|---|---|---|---|---|---|---|---|---|---|
| Inkset | First ink | A | A | A | A | A | A | A | A | A |
|  | Second ink | A | B | C | D | E | F | G | H | I |
| Recording condition | Attached amount of the first ink (mg/inch²) | 200 | 200 | 200 | 200 | 200 | 200 | 200 | 200 | 200 |
|  | Presence of pretreatment process | Yes | Yes | Yes | Yes | Yes | Yes | Yes | Yes | Yes |
| Evaluation test | Aggregates at gas-liquid interface (second ink) | Δ | ○ | ◎ | ◎ | ◎ | ○ | ◎ | ○ | Δ |
|  | Friction resistance | ◎ | ◎ | ◎ | ◎ | ◎ | ◎ | ◎ | ◎ | ◎ |
|  | Bleeding of second ink (superimposed area of first ink + second ink) | ◎ | ◎ | ◎ | ◎ | X | ◎ | ◎ | ◎ | ◎ |
|  | OD value of color ink | ◎ | ◎ | ◎ | ◎ | ◎ | ◎ | ◎ | ◎ | ◎ |
|  | Concealing property of first ink | A | A | A | A | A | A | A | A | A |

|  |  | Example 10 | Example 11 | Example 12 | Example 13 | Example 14 | Example 15 | Example 16 | Example 17 | Example 18 |
|---|---|---|---|---|---|---|---|---|---|---|
| Inkset | First ink | A | A | A | A | A | A | A | B | A |
|  | Second ink | J | K | L | M | N | C | C | C | C |
| Recording condition | Attached amount of the first ink (mg/inch²) | 200 | 200 | 200 | 200 | 200 | 220 | 160 | 200 | 200 |
|  | Presence of pretreatment process | Yes | Yes | Yes | Yes | Yes | Yes | Yes | Yes | No |
| Evaluation test | Aggregates at gas-liquid interface (second ink) | ○ | ◎ | ◎ | ◎ | ○ | ◎ | ◎ | ◎ | ◎ |
|  | Friction resistance | ◎ | ◎ | ◎ | ◎ | ◎ | ◎ | ◎ | ◎ | ◎ |
|  | Bleeding of second ink (superimposed area of first ink + second ink) | ◎ | ◎ | ◎ | X | ◎ | ○ | ◎ | X | X |
|  | OD value of color ink | ◎ | ◎ | ◎ | ◎ | ◎ | ◎ | ◎ | ○ | X |
|  | Concealing property of first ink | A | A | A | A | A | A | B | B | C |

TABLE 5

|  |  | Comparative example 1 | Comparative example 2 | Comparative example 3 | Comparative example 4 | Comparative example 5 | Comparative example 6 | Comparative example 7 |
|---|---|---|---|---|---|---|---|---|
| Inkset | First ink | A | A | A | A | A | A | B |
|  | Second ink | O | P | Q | R | S | T | T |

TABLE 5-continued

|  |  | Comparative example 1 | Comparative example 2 | Comparative example 3 | Comparative example 4 | Comparative example 5 | Comparative example 6 | Comparative example 7 |
|---|---|---|---|---|---|---|---|---|
| Recording condition | Attached amount of the first ink (mg/inch$^2$) | 200 | 200 | 200 | 200 | 200 | 200 | 200 |
|  | Presence of pretreatment process | Yes | Yes | Yes | Yes | Yes | Yes | Yes |
| Evaluation test | Aggregates at gas-liquid interface (second ink) | X | X | X | X | ◎ | X | X |
|  | Friction resistance | ◎ | ◎ | ◎ | ◎ | X | ◎ | ◎ |
|  | Bleeding of second ink (superimposed area of first ink + second ink) | ◎ | ◎ | ◎ | ◎ | ◎ | ◎ | ○ |
|  | OD value of color ink | ◎ | ◎ | ◎ | ◎ | ◎ | ◎ | ○ |
|  | Concealing property of first ink | A | A | A | A | A | A | B |

TABLE 6

| Used ink | Second ink A | Second ink F | Second ink G |
|---|---|---|---|
| Tension test results | A | B | C |

According to the evaluation results in Tables 4 and 5, since the inksets according to the examples included the ink containing a resin and a particular emulsifier, the generation of the aggregates at the gas-liquid interface could be suppressed and an image with excellent friction resistance could be obtained.

On the other hand, since the inksets according to Comparative Examples 1 to 4, 6, and 7 did not include the ink containing a particular emulsifier, the generation of aggregates at the gas-liquid interface could not be suppressed.

Further, since the inkset according to Comparative Example 5 used the second ink containing no resin, the friction resistance of the second image was significantly degraded.

The invention is not limited to the above-described embodiments and various modifications are possible. For example, the invention includes substantially the same configuration (for example, a configuration in which functions, methods, and results are the same or a configuration in which the purposes or effects are the same) as the configuration described in the embodiments. Further, the invention includes a configuration in which a part which is not substantial in the configuration described in the embodiments is replaced. Furthermore, the invention includes a configuration exerting the same operational effects as those of the configuration described in the embodiments or a configuration capable of implementing the same purposes as those of the configuration described in the embodiments. In addition, the invention includes a configuration made by adding a known technology to the configuration described in the embodiments.

The entire disclosure of Japanese Patent Application No.:2013-016567, filed Jan. 31, 2013 is expressly incorporated by reference herein.

What is claimed is:

1. An ink set for ink jet textile printing, comprising:
a first ink having a white-based pigment and a urethane-based resin, the first ink not substantially including an emulsifier; and
a second ink having a pigment, a resin and an emulsifier, wherein the emulsifier includes at least a nonionic emulsifier represented by the following general formula, whose HLB value is 12 or more,

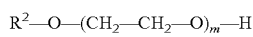

(in the general formula, R$^2$ represents a substituted or unsubstituted hydrocarbon group having 16 or more carbon atoms and m represents an integer from 2 to 20),
wherein the white-based pigment is comprised of titanium oxide, and
wherein the urethane-based resin is comprised of at least one of a polyether type urethane resin, a polyester type urethane resin, and a polycarbonate type urethane resin.

2. The inkset for ink jet textile printing according to claim 1, wherein the content of the emulsifier contained in the second ink is from 0.03% by mass to 0.3% by mass.

3. The inkset for ink jet textile printing according to claim 1, wherein the first ink is used to form a base layer to which the second ink is attached on a cloth.

4. The inkset for ink jet textile printing according to claim 1,
wherein the pigment contained in the first ink is a white-based pigment, and
the pigment contained in the second ink is a pigment other than the white-based pigment.

5. The inkset for ink jet textile printing according to claim 4, wherein the white-based pigment is titanium oxide.

6. The inkset for ink jet textile printing according to claim 1, wherein the coating elongation of the resin contained in the first ink and the coating elongation of the resin contained in the second ink are in the range of 400% to 1200%.

7. The inkset for ink jet textile printing according to claim 1, wherein both the resin contained in the first ink and the resin contained in the second ink contain at least one kind selected from a urethane-based resin and an acrylic resin.

8. An ink jet textile printing method using the inkset for ink jet textile printing according to claim 1, comprising:
forming a first image formed by the first ink by attaching the first ink to a cloth; and
forming a second image formed by the second ink by attaching the second ink to the first image.

9. The ink jet textile printing method according to claim 8, wherein the forming of the second image is performed when a residual rate of a volatile component is 30% or more in a case in which the weight of the volatile component contained in the first ink used to form the first image is set to 100%.

10. The ink jet textile printing method according to claim 8, wherein a coagulant which reacts with a component contained in the first ink is provided in a range of the cloth on which the first image is formed.

11. The ink jet textile printing method according to claim 8, wherein the attached amount of the first ink attached to the cloth is 180 mg/inch$^2$ or more in the forming of the first image.

12. The inkset for ink jet textile printing according to claim 1, wherein the first ink and the second ink are ink jet textile printing inks.

13. An ink set for ink jet textile printing, comprising:
a first ink having a white-based pigment and a urethane-based resin, the first ink not substantially including an emulsifier; and
a second ink having a pigment, a resin and an emulsifier,
wherein the emulsifier includes a nonionic emulsifier represented by the following general formula, whose HLB value is 12 or more,

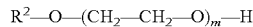

(in the general formula, $R^2$ represents a substituted or unsubstituted hydrocarbon group having 16 or more carbon atoms and m represents an integer from 2 to 20),
wherein the white-based pigment is comprised of titanium oxide, and
wherein the urethane-based resin is comprised of at least one of a polyether type urethane resin, a polyester type urethane resin, and a polycarbonate type urethane resin.

14. The inkset for ink jet textile printing according to claim 13, wherein the content of the emulsifier contained in the second ink is from 0.03% by mass to 0.3% by mass.

15. The inkset for ink jet textile printing according to claim 13, wherein the first ink is used to form a base layer to which the second ink is attached on a cloth.

16. The inkset for ink jet textile printing according to claim 13, wherein the pigment contained in the first ink is a white-based pigment, and the pigment contained in the second ink is a pigment other than the white-based pigment.

17. The inkset for ink jet textile printing according to claim 16, wherein the white-based pigment is titanium oxide.

18. The inkset for ink jet textile printing according to claim 13, wherein the coating elongation of the resin contained in the first ink and the coating elongation of the resin contained in the second ink are in the range of 400% to 1200%.

19. The inkset for ink jet textile printing according to claim 13, wherein both the resin contained in the first ink and the resin contained in the second ink contain at least one kind selected from a urethane-based resin and an acrylic resin.

20. An ink jet textile printing method using the inkset for ink jet textile printing according to claim 13, comprising:
forming a first image formed by the first ink by attaching the first ink to a cloth; and
forming a second image formed by the second ink by attaching the second ink to the first image.

21. The ink jet textile printing method according to claim 20, wherein the forming of the second image is performed when a residual rate of a volatile component is 30% or more in a case in which the weight of the volatile component contained in the first ink used to form the first image is set to 100%.

22. The ink jet textile printing method according to claim 20, wherein a coagulant which reacts with a component contained in the first ink is provided in a range of the cloth on which the first image is formed.

23. The ink jet textile printing method according to claim 20, wherein the attached amount of the first ink attached to the cloth is 180 mg/inch2 or more in the forming of the first image.

24. The inkset for ink jet textile printing according to claim 13, wherein the first ink and the second ink are ink jet textile printing inks.

* * * * *